United States Patent [19]

Kiang

[11] Patent Number: 5,101,439
[45] Date of Patent: Mar. 31, 1992

[54] SEGMENTATION PROCESS FOR MACHINE READING OF HANDWRITTEN INFORMATION

[75] Inventor: Richard K. Kiang, New York, N.Y.

[73] Assignee: AT&T Bell Laboratories, Murray Hill, N.J.

[21] Appl. No.: 576,246

[22] Filed: Aug. 31, 1990

[51] Int. Cl.$^5$ ............................................. G06K 9/34
[52] U.S. Cl. ........................................ 382/9; 382/13; 382/14; 382/15; 382/30; 382/18
[58] Field of Search ................... 382/9, 13, 14, 15, 39, 382/46, 16, 18, 30, 37, 44, 22, 10; 358/107, 101

[56] References Cited

U.S. PATENT DOCUMENTS

| | | | |
|---|---|---|---|
| 4,567,610 | 1/1986 | McConnel | 382/30 |
| 4,594,732 | 6/1986 | Tsuji | 382/18 |
| 4,850,025 | 7/1984 | Abe | 382/9 |

Primary Examiner—Michael Razavi
Attorney, Agent, or Firm—C. E. Graves

[57] ABSTRACT

An improved machine process for recognizing the transition point between letters and digits in handwritten text is disclosed. The script, digits and/or letters, is mapped onto a pixel matrix. The entropy for each column for a range of assumed slant angles is analyzed to determine the angle at which image entropy is a minimum. By reverse-shifting the pixel array an amount equal to this angle, the slant component of the script is verticalized and the segmentation step which follows is more accurately accomplished.

7 Claims, 5 Drawing Sheets

FIG. 1
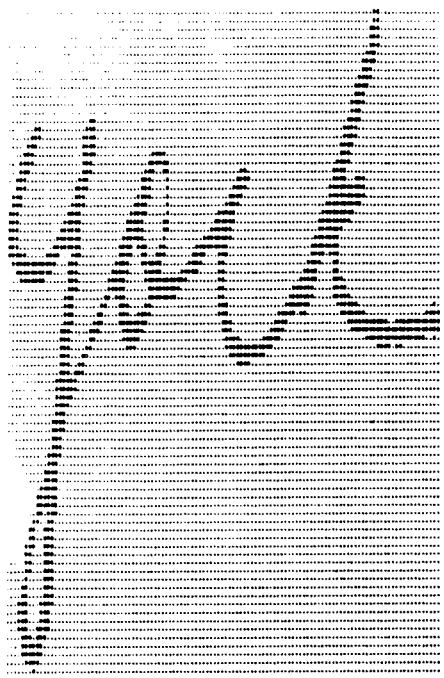
FIG. 2
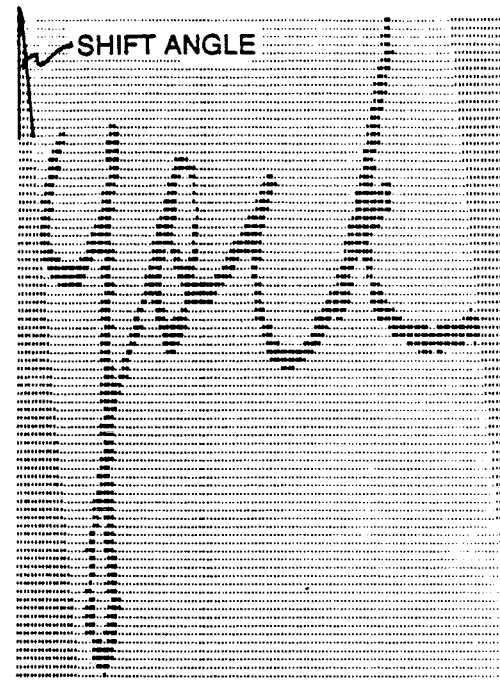
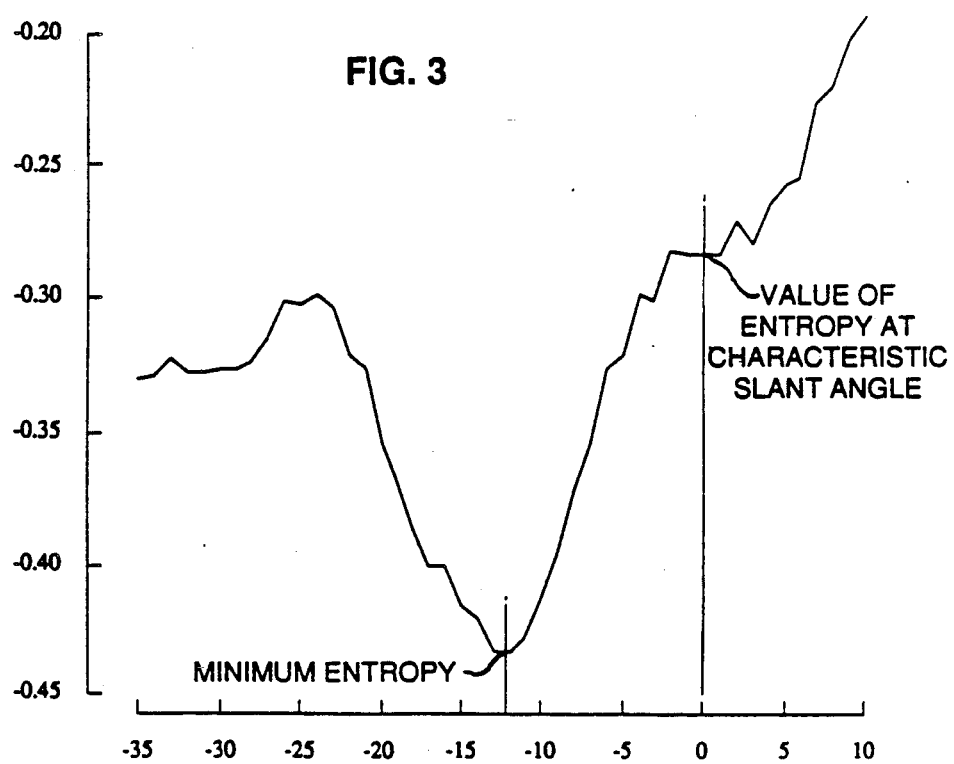
FIG. 3

SEGMENTATION PROCESS FOR MACHINE READING OF HANDWRITTEN INFORMATION

GOVERNMENT CONTRACT

The U.S. Postal Service has rights in this invention pursuant to Task Order Number 104230-90-C-2456.

FIELD OF THE INVENTION

This invention relates to optical character recognition. More specifically, the invention relates to improved processes for recognizing letters and digits in handwritten text by improving the step of segmenting the connected letters/digits into individual components.

BACKGROUND OF THE INVENTION

One of the promising applications of automated script reading technology is the machine reading of script-written names and addresses in postal systems. To separate handwritten text such as street address and zipcode information into discrete digits and letters, the handwritten strokes or script must be separated. In the art of machine reading of script, this step is called "segmentation".

Typically, individual handwriting exhibits a characteristic global slant. By eliminating slant in a specimen of script, it becomes easier to machine-slice the script into its letter or number components. One approach to eliminating the slant factor, is to manipulate the individual handwriting strokes to maximize the verticality of the strokes. The characteristic slant angle thus is essentially removed; and the algorithms for operating on the still-connected script to separate it into discrete letters and numbers can then be deployed more successfully.

Obtaining a relatively reliable estimate of the global characteristic slant angle in a given specimen of script has proven difficult in practice. One reason is the wide individual variability of slant and style in handwriting. Slant angles encountered in script span a range of many degrees. Further, there is an uncertainty of knowing whether the slant component in a given element of script is due to the inherent shape of the letter/number, or to the writer's penmanship. Another reason is that some letters and numbers, even if consciously written without slant, have shapes that inherently contain slanted segments. Further, there is the fundamental question of how to define "characteristic slant angle" of script in terms that can be simply translated to manipulatable data elements.

OBJECTS OF THE INVENTION

Accordingly, one object of the invention is to improve the accuracy of recognition of handwritten digits and letters.

A further object of the invention is to improve the process of removal of the slant from handwritten digits and letters imparted by the writer's characteristic style of penmanship.

A further object of the invention is to improve processes for reading of isolated handwritten zip-code digits.

A more specific object of the invention is to provide a machine process that increases the probability of correctly identifying the characteristic slant angle present in letters and digits in handwritten script, thereby to correctly identify the border between advancement letters or digits.

SUMMARY OF THE INVENTION

These and other objects of the invention are achieved by machine mapping of handwritten digits and letters onto a pixel matrix of a predetermined X-Y granularity, and analyzing the entropy for each column for a range of assumed slant angles. The angle at which the entropy is found to be a minimum is, on average, the angle at which the distances or gaps between adjacent letters/digits is maximized. With this information determined, the letter/digit pixel mapping is altered, by shifting each pixel row in a direction opposite to the slant, thereby to remove, or normalize the global slant. After global de-slanting, if no appreciable vertical overlap from one digit to the next is present, then segmentation can be accomplished by a machine dissecting of the script object into vertical slices.

BRIEF DESCRIPTION OF THE DRAWING

FIGS. 1 and 2 are replicas of pixel screens illustrating the placement of dark pixels defining script at different slant angles;

FIG. 3 is a graph showing entropy as a function of slant angle;

DETAILED DESCRIPTION OF AN ILLUSTRATIVE EMBODIMENT

Figure 4:
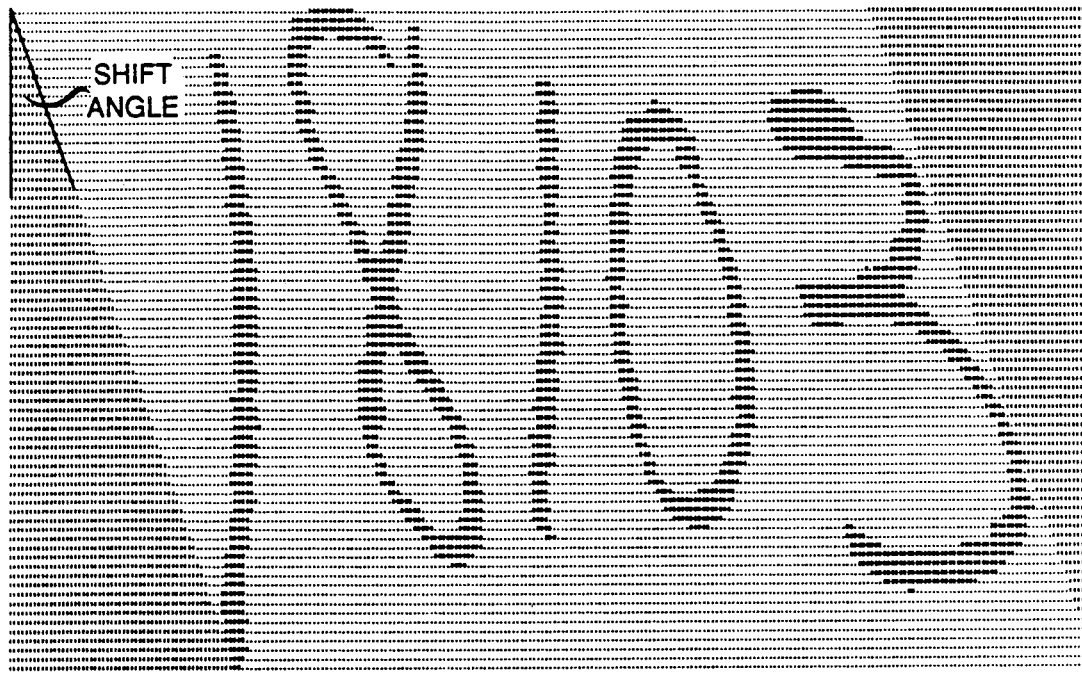
FIGS. 4 and 5 are similar to FIGS. 1 and 2, illustrating pixel representation of a number.

By way of background, it will be recalled that C. E. Shannon, in his paper "A Mathematical Theory of Communications" Bell System Technical Journal, Vol. 27, No. 3, taught that a discrete information source can be represented by a Markov process. Further, the quantity of information produced in such a process can be measured by entropy, H:

$$H = - \sum_{i=1}^{N} p_i \log_a p_i \qquad \text{(Equation 1)}$$

where $p_i$ is the probability of occurrence of the ith symbol. The N symbols are assumed to be uncorrelated. In bit representation, the logarithm in the above equation becomes 2-based.

It can be shown that H is maximum when $p_1 = p_2 = \ldots = p_N = 1/N$. Also, H is minimum when only one type of event is possible ($P_i = \delta_{ik}$).

Specifically, if n bits are used to represent the states or types of events, then:

$$H_{max} = - \sum_i \frac{1}{N} \log_2 \frac{1}{N} = \log_2 2^n = n \text{ bits} \qquad \text{(Equation 2)}$$

$$H_{min} = 0 \qquad \text{(Equation 3)}$$

The pixel data is manipulated in accordance with the invention in general in the following steps.

First, a pixel image of the original handwriting is captured by imaging cameras. This original image reflects the writer's characteristic penmanship style, including any slant component. For this original pixel image, the number of dark pixels falling in each pixel column, and the total number of dark pixels in the image, are counted. Next, the ratio of columnar dark pixels to total dark pixels is determined for each pixel column. Now, in accordance with the invention, the entropy of the column projections is computed, in accordance with the relationship stated in Eq. 1. The resultant value is the entropy of the pixel image at the particular characteristic slant angle of the writer, without yet applying any variations to the slant.

In accordance with a further aspect of the invention, the individual rows of pixels in the total stack are each shifted a first time, with the objective of varying the slant angle from that exhibited in the writer's characteristic script. The varying may be accomplished, for example, by moving each individual row an amount that is lineally proportional to its distance from a stationary reference row. Thus, for example, the bottom-most pixel row is kept stationary, the top-most row is shifted to the right by an amount equal to the length of a pixel side, and the intermediary rows shifted proportional amounts. The effect of the shifting is to present a revised total pixel image in which the slant component has been varied from the nominal or original.

The preceding step is repeated a plurality of times, in which for each time, the top row (to use the same example) is shifted successively greater distances, while keeping the bottom row stationary, and moving the intermediary rows proportionately. With each shift, the number of dark pixels falling in each pixel column are counted; and the ratio of columnar dark pixels to total dark pixels is determined for each pixel column. The entropy of the individual column projections is computed, in accordance with the relationship stated in Eq. 1.

The shifting of pixel rows is effected in increments both to the right and to the left. As a result, the slant angle is varied over a range of, for example, 10 degrees from the normal in a clockwise direction and 40 degrees from the normal in a counterclockwise direction.

The unique value of the entropy associated with the pixel image after each shift, is then evaluated to determine minimum entropy value in accordance with Eq. 3. The slant angle associated with this minimum entropy value, is the predominant slant angle present in the writing, and therefore determines the amount by which the original pixel array should be shifted in order to remove the slant component of the writing.

Finally, the pixel rows of the original image are shifted to the left or right proportionally by that angle, or linear shift amount, that reduces the characteristic slant to zero. The shift direction is opposite to the slant in order to remove the global slant.

At this stage, the handwriting is essentially made vertical no matter what slant angle it contained originally, and is ready to be segmented.

The following examples will further illustrate the de-slanting process of the invention.

Figure 7:
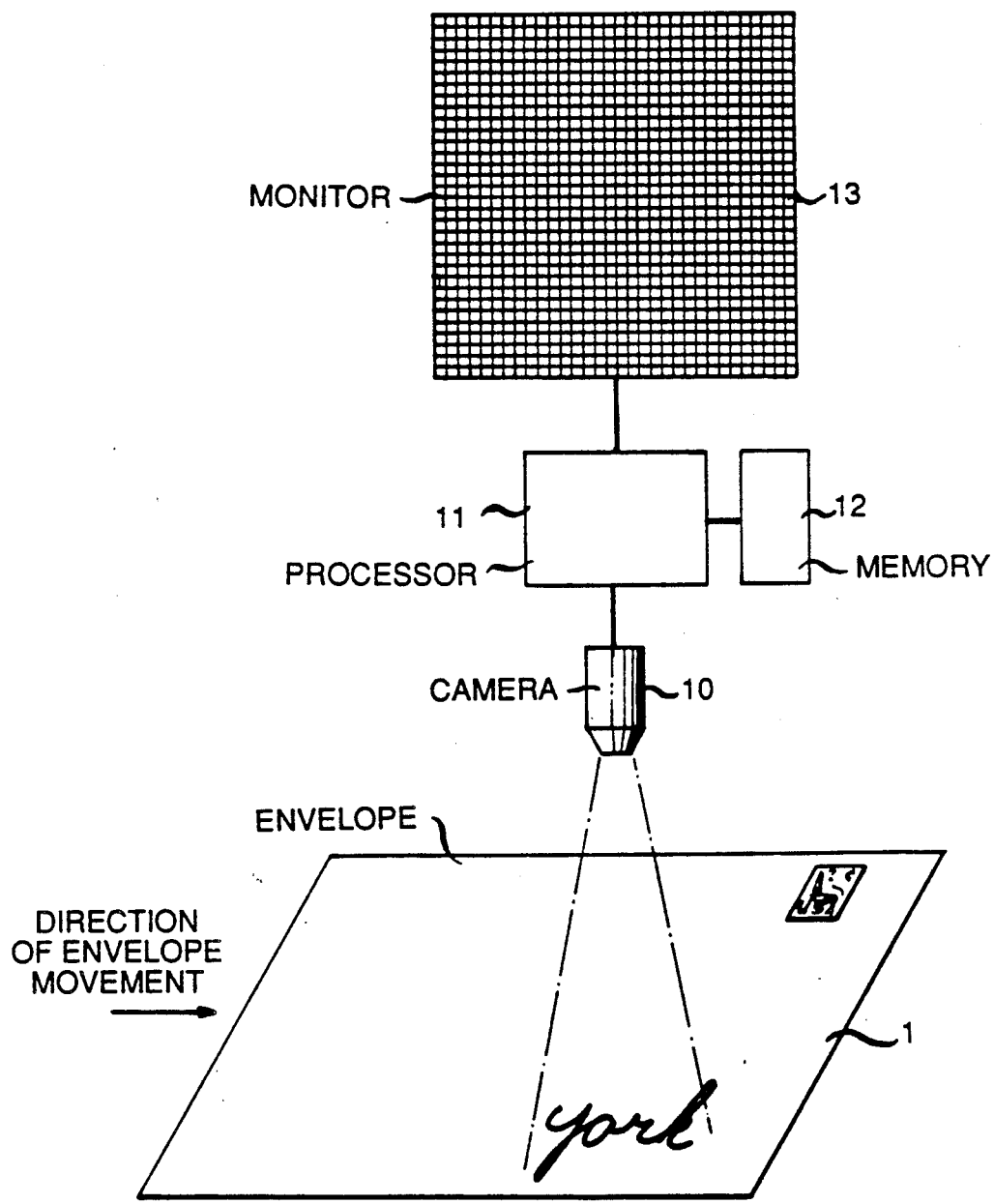
FIG. 7 is a high-level functional block diagram of apparatus for practicing the invention.
Figure 8:
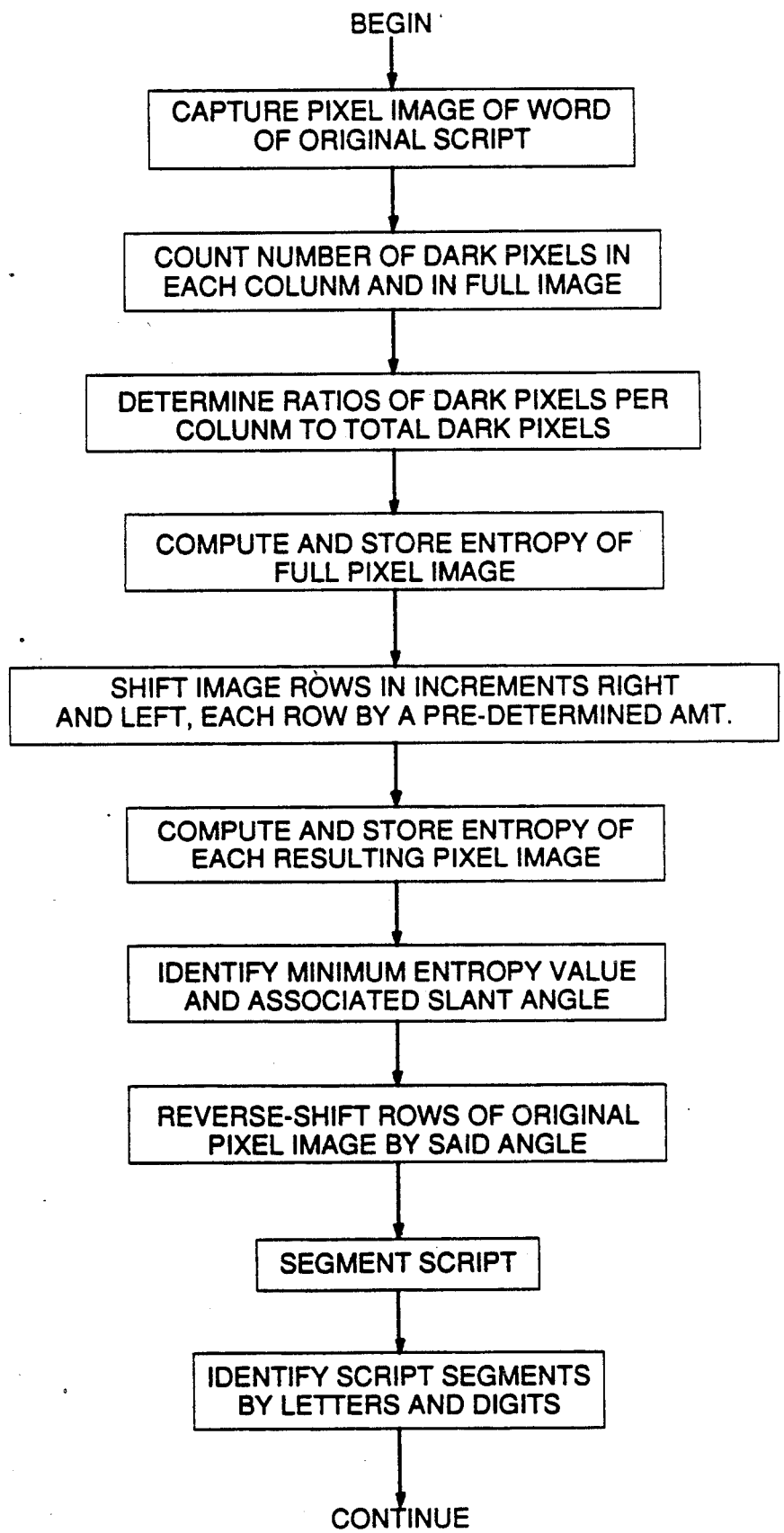
FIG. 8 is a flowchart description of the inventive process.

In the first example, as seen in FIG. 1, the handwritten word "York", comprises part of as address on an envelop. The elongate strokes show a decided slant, in a clockwise direction from the vertical. The envelop, denoted 1 and shown in FIG. 7, is moved on a conveyer means (not shown) into position under a scanning video camera 10. A processor 11, which for example can include an AT&T PC6300, receives the video signal raster from camera 10. In conventional fashion, processor 11 inputs to its memory 12, and also to a monitor 13 if desired, an image of the word "York". The pixel representation is as shown in FIG. 1; but it is understood that the information from which the dark and light pixels are created, is contained in memory 12. Advantageously, pixel density can be 300 per inch, or any other useful density of choice.

In accordance with the invention, the original pixel image information in memory 12 is analyzed. The number of dark pixels falling in each pixel column and the total number of dark pixels are calculated; and the ratio of dark pixels to total dark pixels is determined for each vertical column. Entropy of the column projections is computed in processor 11 in accordance with Eq. 1.

The information comprising the individual pixel rows is now successively shifted in increments to vary the slant angle from the slant angle present in the original script. Following each shift, the entropy of the individual column projections is computed, as per the relationship of Eq. 1.

FIG. 3 shows the range of slant angles varying from −35 degrees to +10 degrees over which the entropy value is calculated. In this example, therefore, over forty measures of entropy are developed, at increments of one degree of slant sample angle. The minimum entropy value in accordance with Eq. 3, is seen to occur at a slant angle seen in FIG. 3 to be approximately −12.5 degrees. Thus, the predominant slant angle present in the word "York" is 12.5 degrees. Processor 11 is controlled to recognize the minimum entropy value and the corresponding slant angle; and to apply that angle to the original pixel grid of FIG. 1 by shifting the respective pixel row information to the right with the result shown in FIG. 2. An inspection of FIG. 2 reveals that the word "York" now is comprised of strokes which to the eye are substantially vertical, and which according to the invention are now more readily segmentable into individual letters.

Figure 5:
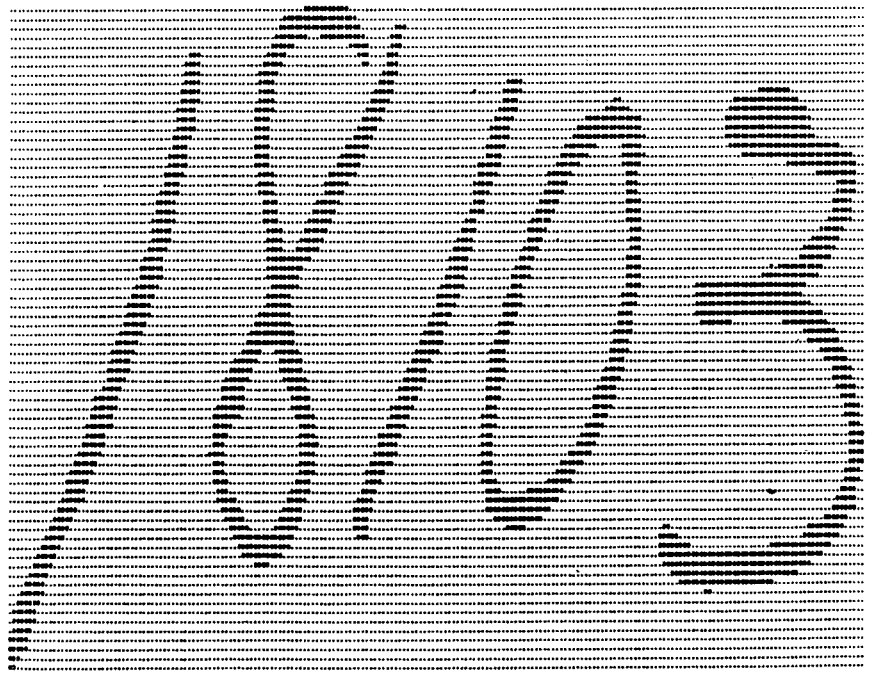
Figure 6:
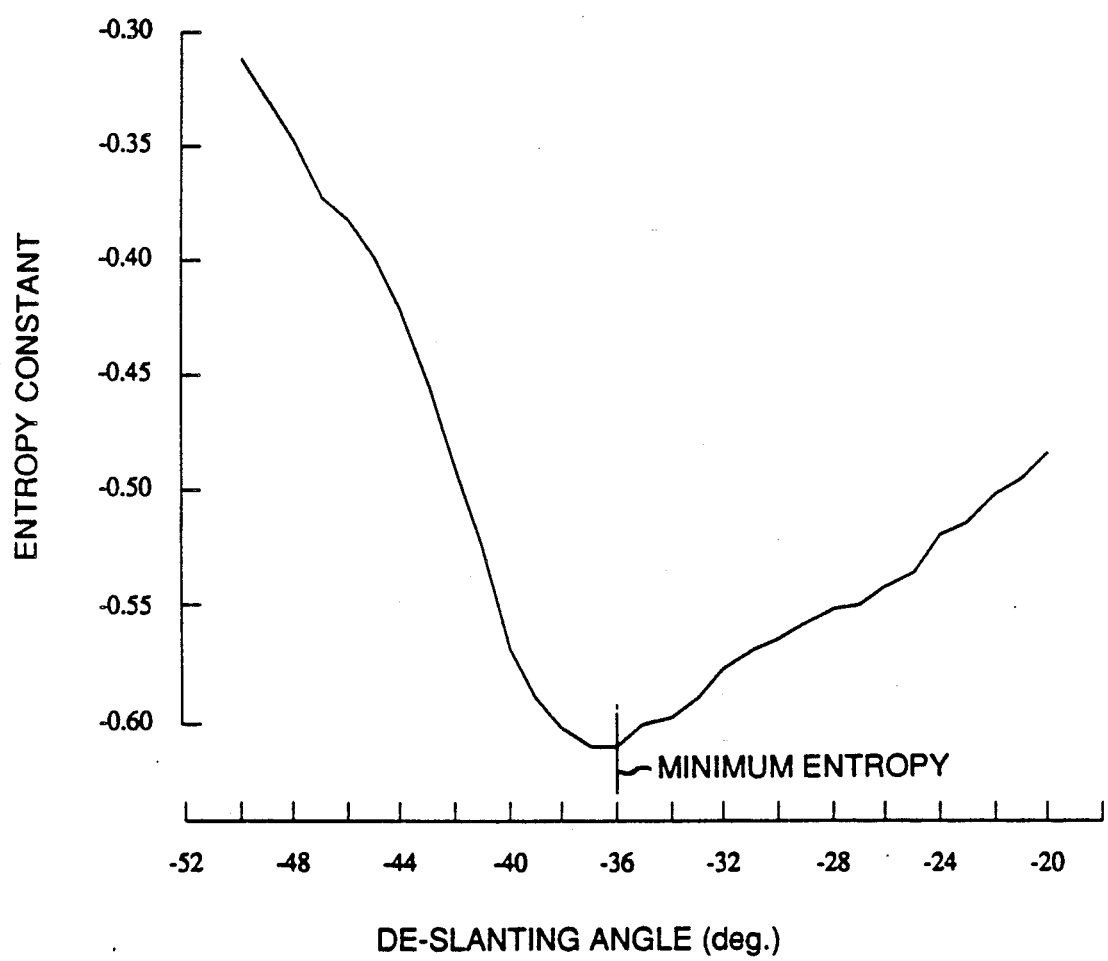
FIG. 6 is a graph plotting the same functions as the graph of FIG. 3, but for a discrete number.

In example 2, illustrated in FIGS. 4, 5 and 6, the same steps as described with respect to example 1, are practiced. The choice of the boundary angles in this example, is from 52 degrees to +30 degrees. For simplicity, the positive-going data was cut off at −20 degrees in FIG. 6. The two examples illustrate the fact that boundary angle end-range values will vary. Obviously, a range should be chosen that is sufficiently wide to be reasonably certain of including the angle at which the entropy is a minimum. The data suggests that a range of, say, from −10 to +10 degrees will miss a lot. At the same time, the range not be so wide as to needlessly lengthen the run time of the computation.

From the preceding, it will be apparent to persons skilled in the art that calculating the total pixel count is not essential. What determines the shape of the functions illustrated in FIGS. 3 and 6 is strictly the total number of dark pixels in each column. To rigorously follow the logic of Eq. 1, however, the total dark pixel count was used.

I claim:

1. In the machine-reading of original handwritten word or number script, a method for normalizing the characteristic slant angle in the script, comprising the steps of:

generating a pixel map of said original script, with said script image aligned on said map in a direction substantially parallel to the horizontal axis of said pixel map;

said map comprising vertical columns and horizontal rows of dark and white pixels, said dark pixels displaying the script of said word or number, and said display exhibiting said characteristic script slant angle relative to said vertical columns;

moving said rows of pixels thereby to generate a first altered script image having a first slant angle;

calculating the total number of dark pixels in said first altered image;

calculating the number of dark pixels in each said vertical column of said first altered image;

calculating the proportion of dark pixels in each column relative to said total dark pixels in said first altered image;

using said proportionality value, computing the entropy value of said first altered image for said first slant angle;

storing said computed entropy value and its associated first slant angle;

successively repositioning said rows of pixels thereby to generate a succession of further altered script images, each of said last-named images having a different slant angle;

computing and storing the entropy values and the respective associated slant angle values for each said further altered image;

determining the angular difference between that slant angle associated with the minimum entropy value and the characteristic slant angle; and with the pixel rows in their original image position, shifting said pixel rows by the amount of said angular difference, thereby to create an image of said handwritten script that has its characteristic slant angle removed.

2. The method in accordance with claim 1, wherein said different slant angles comprise a range with end points located on either side of said characteristic slant angle.

3. The method in accordance with claim 1, wherein said successive repositioning of said rows of pixels comprises moving each individual pixel row an amount linerally proportional to its distance from a selected stationary pixel reference row.

4. The method in accordance with claim 1, wherein said successive repositioning of said rows of pixels comprises keeping the top-most pixel row stationary, shifting the bottom-most pixel row to the right in incremental steps substantially equal to the length of a pixel side, and shifting the intermediary rows by amounts proportional to their respective distances from the reference row.

5. The method in accordance with claim 4, comprising the further step of segmenting the now-normalized script into its discrete letters or digits.

6. Apparatus for normalizing the characteristic slant angle in original handwritten word or number script, comprising:

means for generating a pixel map of said script, with said script image aligned on said map in a direction substantially parallel to the horizontal axis of said pixel map;

said map comprising vertical columns and horizontal rows of dark and white pixels, said dark pixels displaying the script of said word or number, and said display exhibiting said characteristic script slant angle relative to said vertical columns;

means for moving said rows of pixels thereby to generate a first altered script image having a first slant angle;

means for calculating the total number of dark pixels in said first altered image;

means for calculating the number of dark pixels in each said vertical column of said first altered image;

means for calculating the proportion of dark pixels in each column relative to said total dark pixels in said first altered image;

means for computing the entropy value of said first altered image;

means for storing said computed entropy value and its associated first slant angle;

means for successively repositioning said rows of pixels thereby to generate a succession of further altered script images, each of said last-named images having a different slant angle;

means for computing and storing the entropy values and the respective associated slant angle values for each said further altered image;

means for determining the angular difference between that slant angle associated with the minimum entropy value and the characteristic slant angle; and with the pixel rows in their original image position, means for shifting said pixel rows by the amount of said angular difference, thereby to create an image of said handwritten script that has its characteristic slant angle removed.

7. Apparatus in accordance with claim 6, further comprising means for segmenting the now-normalized script into its discrete letters or digits.

* * * * *